United States Patent
Lai et al.

(10) Patent No.: US 11,052,588 B2
(45) Date of Patent: Jul. 6, 2021

(54) ELECTRICALLY-DRIVEN ROTOR IRON CORE MAGNETIC STEEL CHAMBER DISPENSING DEVICE

(71) Applicant: GALLANT MICRO. MACHINING CO., LTD., New Taipei (TW)

(72) Inventors: Hung-Neng Lai, New Taipei (TW); Mu-Ching Chang, New Taipei (TW); Chih-Hung Hsu, New Taipei (TW)

(73) Assignee: GALLANT MICRO. MACHINING CO., LTD., New Taipei (TW)

( * ) Notice: Subject to any disclaimer, the term of this patent is extended or adjusted under 35 U.S.C. 154(b) by 126 days.

(21) Appl. No.: 16/527,141

(22) Filed: Jul. 31, 2019

(65) Prior Publication Data

US 2020/0316834 A1  Oct. 8, 2020

(30) Foreign Application Priority Data

Apr. 8, 2019  (CN) .......................... 201910274491.1

(51) Int. Cl.
   *B29C 45/14*  (2006.01)
   *B29C 45/26*  (2006.01)
   *B29L 31/00*  (2006.01)

(52) U.S. Cl.
   CPC ........ *B29C 45/26* (2013.01); *B29C 45/14639* (2013.01); *B29L 2031/7498* (2013.01)

(58) Field of Classification Search
   CPC ........ B29C 2045/2671; B29C 45/2669; B29C 45/14639; H02K 15/12; H02K 15/03
   See application file for complete search history.

(56) References Cited

U.S. PATENT DOCUMENTS

| | | | | |
|---|---|---|---|---|
| 9,373,991 | B2* | 6/2016 | Mabu | H02K 15/03 |
| 2016/0056694 | A1* | 2/2016 | Mabu | H02K 15/12 |
| | | | | 29/598 |
| 2016/0134179 | A1* | 5/2016 | Nagai | H02K 15/12 |
| | | | | 29/598 |
| 2016/0294262 | A1* | 10/2016 | Yomoda | H02K 1/2766 |
| 2018/0304505 | A1* | 10/2018 | Ishimatsu | H01F 41/0206 |

FOREIGN PATENT DOCUMENTS

JP  56068254 A  *  6/1981  ............. H02K 15/03

\* cited by examiner

*Primary Examiner* — Robert B Davis
(74) *Attorney, Agent, or Firm* — Schmeiser, Olsen & Watts, LLP

(57) ABSTRACT

An electrically-driven rotor iron core magnetic steel chamber dispensing device is introduced. Dispensing units each include a dispensing channel, dispensing head, plunger barrel, plunger and stop-injection opening pin. The dispensing channel is above the dispensing head and in communication with the dispensing head. The dispensing head is disposed at the top of the plunger barrel and in communication with the plunger barrel. The plunger is displaced in the plunger barrel to move up and down relative to the plunger barrel. The stop-injection opening pin includes a pin body disposed vertically, arranged beside the plunger barrel, and fixed to a lower mold from inside. A pin head portion is disposed at the top of the pin body. A barb is disposed between the pin head portion and the pin body. The pin head portion protrudes into the dispensing channel, allowing molten plastic in the dispensing channel to enter the barb.

12 Claims, 5 Drawing Sheets

ELECTRICALLY-DRIVEN ROTOR IRON CORE MAGNETIC STEEL CHAMBER DISPENSING DEVICE

CROSS-REFERENCE TO RELATED APPLICATION

This non-provisional application claims priority under 35 U.S.C. § 119(a) on Patent Application No(s). 201910274491.1 filed in China on Apr. 8, 2019, the entire contents of which are hereby incorporated by reference.

BACKGROUND OF THE INVENTION

1. Field of the Invention

The present disclosure relates to the field of dispensing equipment, and in particular to an electrically-driven rotor iron core magnetic steel chamber dispensing device for performing a dispensing process in the gaps between a rotor iron core and a magnetic steel chunk of an electrically-driven rotor and thus fixing the magnetic steel chunk firmly to a magnetic steel chamber reserved in the rotor iron core.

2. Description of the Related Art

Conventional steel chunks are equidistantly arranged on the inner circumferential surface of a conventional electrically-driven permanent magnetic rotor. Fixed gaps are reserved between each magnetic steel chunk and holes of a rotor iron core. An assembly process entails inserting the magnetic steel chunks into the holes of the rotor iron core. To prevent the loosening (caused by a temperature increase during high-speed rotation of the rotor) of the magnetic steel chunks and thus resultant safety risks and preclude noise otherwise generated as a result of vibration within the holes of the magnetic steel chunks. In view of this, the gaps of the magnetic steel chunks have to be filled with thermoset resin plastic so as for the magnetic steel chunks to be fixed in place. The thermoset resin is produced by heating up resin to cause a chemical change therein, followed by gradual curing. Once cured, the thermoset resin will not be softened or dissolved even if heated again.

Conventional dispensing processes generally fall into two categories. The first one is carried out manually; hence, it is inefficient and predisposed to imprecise dispensing position and uneven dispensing. The second one is carried out with a conventional dispensing device. However, the conventional dispensing device requires a lengthy dispensing channel and a large plastic block, thereby causing a waste of plastic, uneven plastic heating, and even premature curing caused by prolonged plastic flow and reaction, eventually leading to a failure to fill the gaps of the magnetic steel chunks. The prior art has two disadvantages. First, the prior art usually entails filling the plastic from the top to the bottom, thereby disadvantageously allowing air to linger inside the gaps of the magnetic steel chamber, leading to uneven, loose plastic filling. Second, conventional dispensing device is applicable to upper dispensing (i.e., performing dispensing in a downward direction) and thus tends to allow air to linger in the gaps of the magnetic steel chamber, eventually leading to uneven, loose filling of plastic. Third, strictly speaking, most conventional dispensing devices fail to achieve automation; after conventional dispensing devices have performed a dispensing process, residual waste plastic cannot be reused (because of the characteristics of thermosetting resin), and thus it is necessary to take the waste plastic out reasonably and send it to a reasonable region; however, conventional dispensing devices are applicable to upper dispensing; when the waste plastic is released from a die, it falls under the gravity and thus cannot be precisely caught and conveyed to a reasonable region. Furthermore, conventional dispensing devices are applicable to upper dispensing and thus cannot reliably achieve reliable separation of the waste plastic and the plastic injected into the magnetic steel chamber.

Therefore, it is important to overcome the aforesaid drawbacks of the prior art.

BRIEF SUMMARY OF THE INVENTION

An objective of the present disclosure is to provide an electrically-driven rotor iron core magnetic steel chamber dispensing device to overcome drawbacks of conventional dispensing, namely inefficient dispensing, lack of precision in dispensing positions, and lack of evenness. Conventional dispensing devices cause a waste of plastic, uneven plastic heating, failure to achieve automation, and failure to achieve reliable separation of the waste plastic and the plastic injected into the magnetic steel chamber.

To achieve at least the above objective, the present disclosure provides an electrically-driven rotor iron core magnetic steel chamber dispensing device which comprises an upper mold and a lower mold, characterized in that: the lower mold comprises dispensing units each corresponding in position to one or two magnetic steel chambers and arranged in a circumferential direction of the electrically-driven rotor relative to the magnetic steel chambers, with dispensing directions being upward; the dispensing units each comprise a dispensing channel, a dispensing head, a plunger barrel, a plunger and a stop-injection opening pin, wherein the dispensing channel is disposed above the dispensing head and in communication with the dispensing head, the dispensing head is disposed at the top of the plunger barrel and in communication with the plunger barrel, the plunger is disposed in the plunger barrel to slide upward and downward relative to the plunger barrel, the stop-injection opening pin comprises a pin body, the pin body is disposed vertically, arranged beside the plunger barrel, and fixed to the lower mold from inside, a pin head portion is disposed at a top of the pin body, a barb is disposed between the pin head portion and the pin body, the pin head portion protrudes into the dispensing channel of the dispensing head such that molten plastic in the dispensing channel can enter the barb, wherein, when cured, the plastic forms a reliable anchorage between the waste plastic and the stop-injection opening pin; the dispensing units in operation inject plastic into the magnetic steel chamber, wherein, after a residue of the waste plastic in the dispensing channel has cured, the pin head portion protruding into the dispensing channel and the waste plastic in the dispensing channel are engaged with each other by the barb and thus fixed together, wherein, upon separation of the upper mold and the lower mold, the lower mold causes the stop-injection opening pin to move away from the upper mold such that the stop-injection opening pin causes the waste plastic to move away from the upper mold, allowing the waste plastic to separate from the plastic injected into the magnetic steel chamber.

Essential technical features of the present disclosure are explained below.

1. The lower mold further comprises a waste plastic plate, a stop-injection opening pressing plate, a waste plastic driving plate and a release post, the waste plastic plate is stacked on the stop-injection opening pressing plate, the waste plastic driving plate is disposed at an end of the waste plastic plate and corresponds in position to the waste plastic plate, a top acting end of the release post acts on the waste plastic driving plate to prevent the waste plastic plate from moving downward together with the lower mold, thereby allowing the waste plastic plate to move away from the stop-injection opening pressing plate.

2. The lower mold further comprises a waste material taking mechanism, and a suction head of the waste material taking mechanism protrudes and acts on the waste plastic as soon as the waste plastic plate moves away from the stop-injection opening pressing plate, such that the waste plastic is lifted, taken and thereby separated from the waste plastic plate.

3. The upper mold comprises a dispensing plate and a gas discharging plate, a dispensing opening is vertically disposed on the dispensing plate, the dispensing opening tapers upward, the dispensing units dispense plastic into the magnetic steel chamber from the dispensing through hole through the dispensing opening, a gas discharging passage is disposed on the gas discharging plate and corresponds in position to another dispensing side of the rotor iron core magnetic steel chamber such that air is discharged through the gas discharging passage during a dispensing process.

4. The dispensing plate further has a dispensing plate driving mechanism, the dispensing plate driving mechanism acts on the dispensing plate to drive the dispensing plate to move away from or move closer to the waste plastic plate.

5. The dispensing channel is disposed at a top of the waste plastic plate, the stop-injection opening pressing plate causes the stop-injection opening pin to move downward as soon as the lower mold causes the stop-injection opening pressing plate to move downward, such that the top-injection opening pin causes the waste plastic to move downward, allowing the waste plastic to separate from the plastic injected into the magnetic steel chamber.

6. The dispensing opening of each said dispensing unit corresponds in position to gaps between the magnetic steel chamber and the magnetic steel chunks from below.

7. Each said magnetic steel chamber comprises an even number of magnetic steel chambers.

The principles and advantages of the present disclosure are described below.

The electrically-driven rotor iron core magnetic steel chamber dispensing device of the present disclosure comprises elements described below. Dispensing units inject plastic into a magnetic steel chamber through a dispensing opening. After a residue of waste plastic left behind in a dispensing channel has cured, a stop-injection opening pin which protrudes into the dispensing channel and the waste plastic are engaged with each other by a barb between a pin head portion and a pin body and fixed together, so as to form a reliable anchorage. The stop-injection opening pressing plate of the lower mold causes the stop-injection opening pin to move away from the upper mold as soon as the upper mold separates from the lower mold, and thus the stop-injection opening pin causes the waste plastic to move away from the upper mold, thereby controlling separation of the waste plastic and the plastic injected into the magnetic steel chamber. Furthermore, the upward filling process performed by the dispensing units prevents air from remaining in the magnetic steel chamber. Moreover, dispensing units each correspond in position to one or two magnetic steel chambers. The dispensing units are arranged in the circumferential direction of the electrically-driven rotor, correspond in position to the magnetic steel chamber, disposed on the outer side of the magnetic steel chamber, and positioned proximate to the magnetic steel chamber, or located in the direction of the projection of the magnetic steel chamber, allowing a large plastic block to be replaced by smaller plastic blocks, and minimizing the length of the dispensing channel. Furthermore, the dispensing opening of each dispensing unit corresponds in position to the magnetic steel chamber from below, allowing upward filling, enhancing the compactness of the plastic filled in the gaps of the magnetic steel chamber, and enhancing the reliability of the magnetic steel chunks fixed in place. Therefore, the present invention effectively avoids a waste of plastic, uneven plastic heating, and premature curing otherwise caused by prolonged plastic flow and reaction. The present disclosure is reliable, robust, short dispensing channel, low waste plasticity, and can effectively ensure separation of the waste plastic and the plastic injected into the magnetic steel chamber, paving the way for subsequent automated operation of delivery of the waste plastic.

DETAILED DESCRIPTION OF THE INVENTION

To facilitate understanding of the object, characteristics and effects of this present disclosure, embodiments together with the attached drawings for the detailed description of the present disclosure are provided.

Embodiment: an electrically-driven rotor iron core magnetic steel chamber dispensing device.

Figure 1:
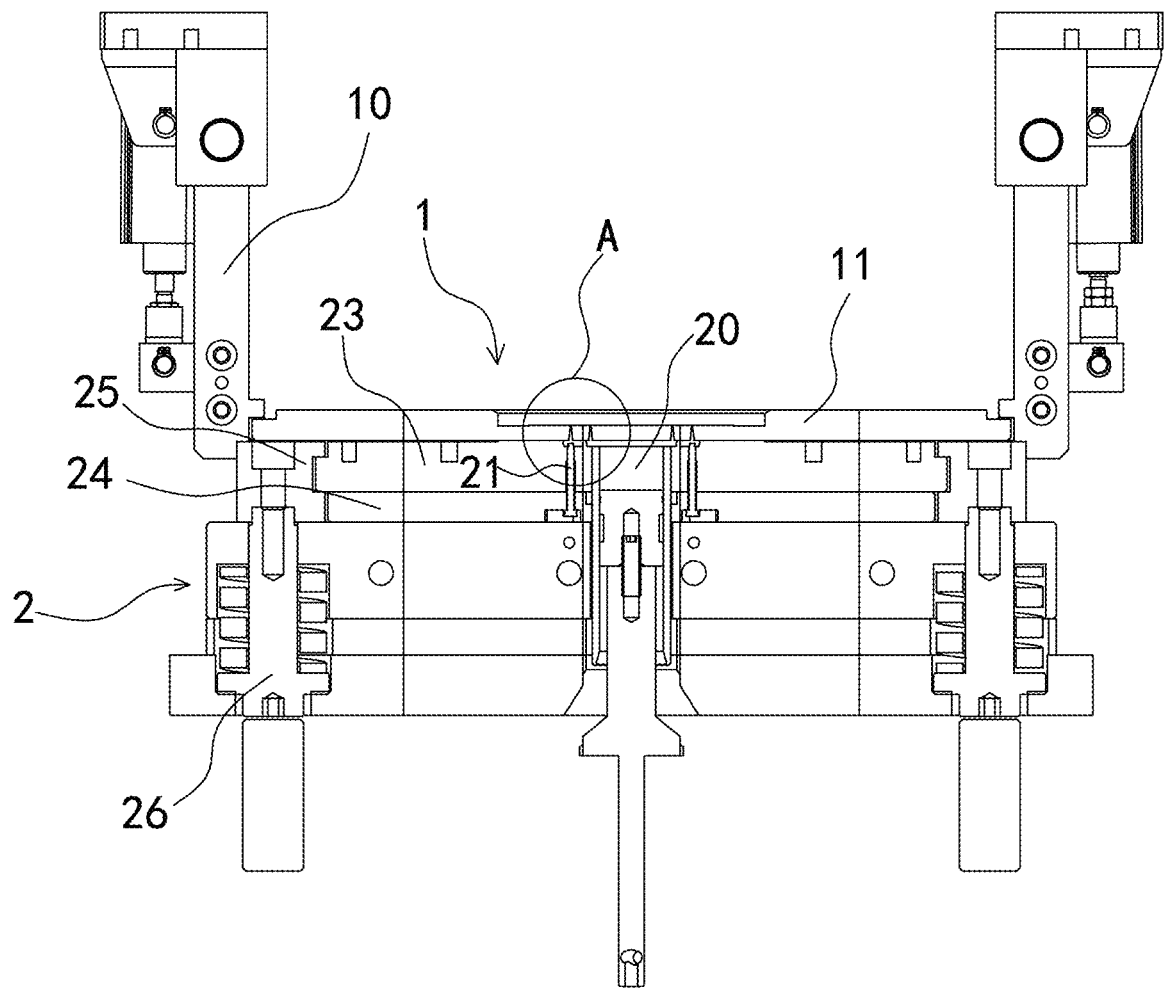
FIG. 1 is a cross-sectional view of this embodiment taken lengthwise along a vertical direction during a die-closing process.
Figure 2:
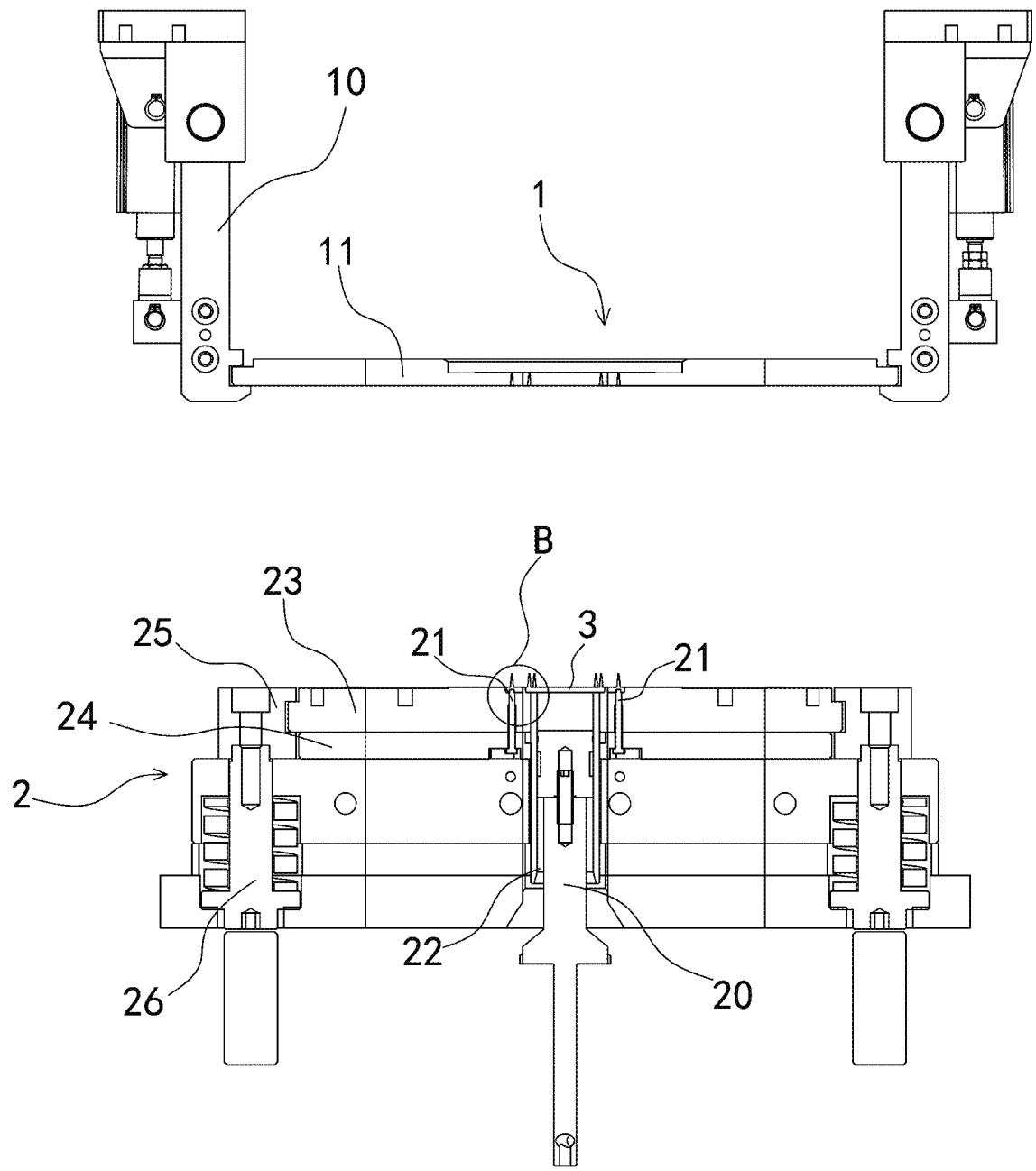
FIG. 2 is a cross-sectional view of this embodiment taken along a vertical direction after a dispensing opening has separated from plastic in a magnetic steel chamber.
Figure 3:
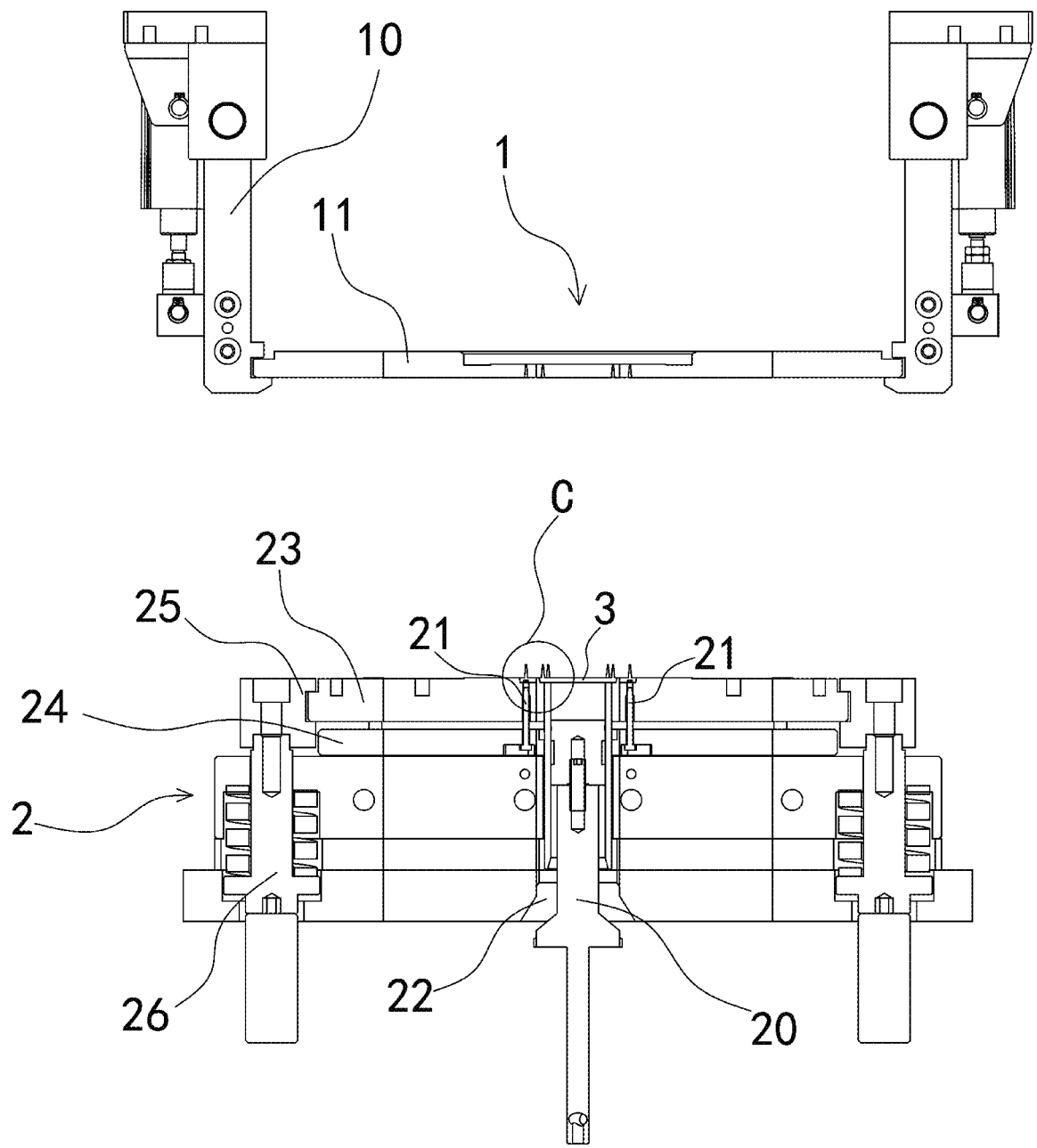
FIG. 3 is a cross-sectional view of this embodiment taken along a vertical direction after a stop-injection opening pin has separated from the waste plastic.
Figure 4:
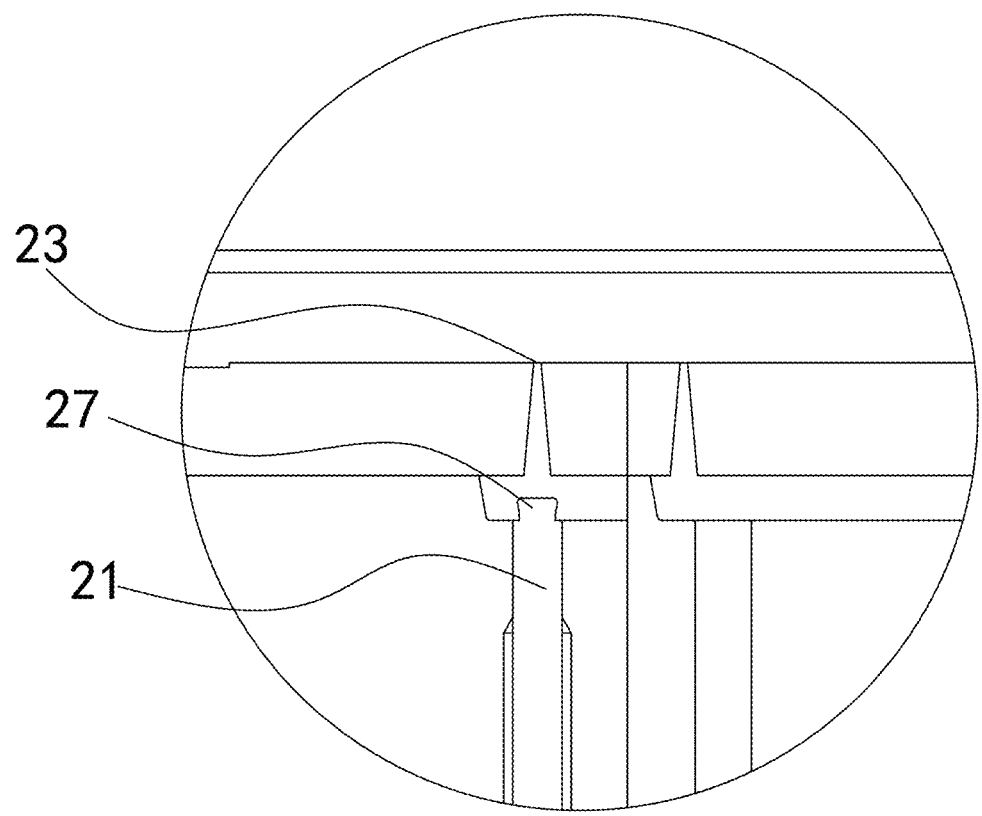
FIG. 4 is an enlarged view of part A in FIG. 1 of this embodiment.
Figure 5:
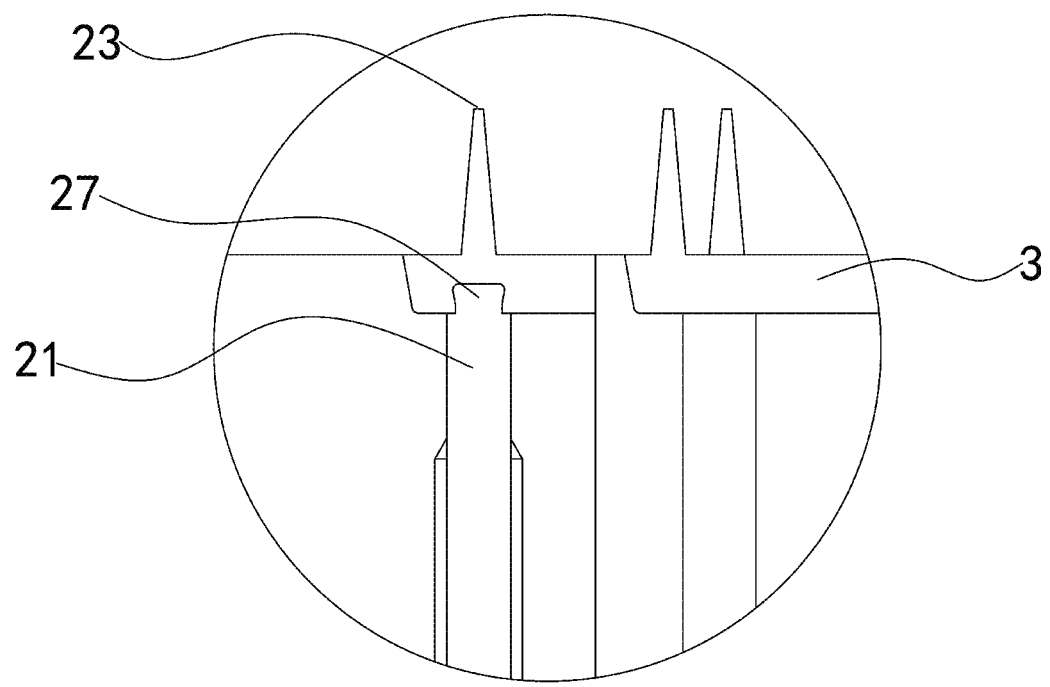
FIG. 5 is an enlarged view of part B in FIG. 2 of this embodiment.
Figure 6:
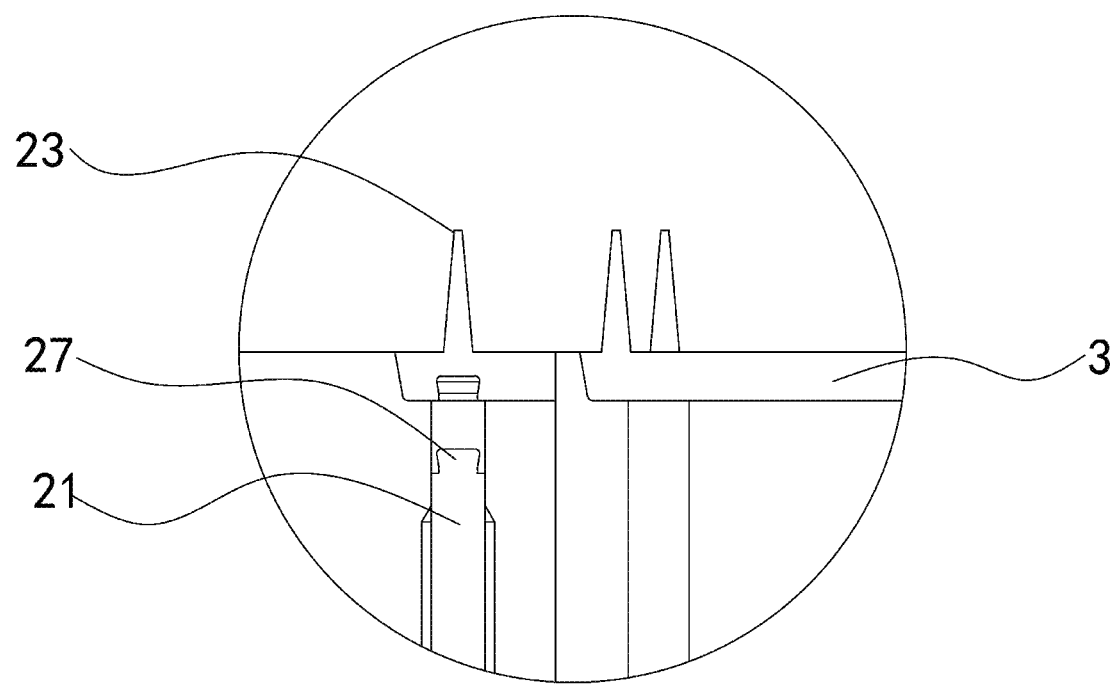
FIG. 6 is an enlarged view of part C in FIG. 3 of this embodiment.

Referring to FIGS. 1-6, in this embodiment the dispensing device is for use in dispensing plastic into the gaps between an electrically-driven rotor iron core magnetic steel chamber and magnetic steel chunks, and the rotor iron core comprises iron core segments stacked up.

The dispensing device comprises an upper mold 1 and a lower mold 2. The lower mold 2 comprises dispensing units. The dispensing units each correspond in position to one or two magnetic steel chambers. Each magnetic steel chamber comprises an even number of magnetic steel chamber. Each magnetic steel chamber comprises four magnetic steel chambers or two magnetic steel chambers. The dispensing units are arranged in the circumferential direction of the electrically-driven rotor and correspond in position to the magnetic steel chambers. All the dispensing units dispense plastic upward. The dispensing units each comprise a dispensing head, a plunger barrel 22, a plunger 20 and a stop-injection opening pin 21. The dispensing head has a dispensing channel. The dispensing channel is disposed at the top of the plunger barrel 22 and is in communication with the plunger barrel 22. The plunger 20 is disposed in the plunger barrel 22 and slides upward and downward relative to the plunger barrel 22. The dispensing opening is disposed at the top of the dispensing head, faces the magnetic steel chamber, and is in communication with the dispensing channel. The dispensing opening of each dispensing unit corresponds in position to the gaps between the magnetic steel chamber and the magnetic steel chunks from below. The stop-injection opening pin 21 comprises a pin body. The pin body is vertically disposed beside the plunger barrel 22 and fixed to the lower mold 2 from inside. A pin head portion 27 is disposed at the top of the pin body. A barb is formed between the pin head portion 27 and the pin body. The pin head portion 27 protrudes into the dispensing channel of the dispensing head such that molten plastic in the dispensing channel can enter the barb. After the plastic has cured, it forms a reliable anchorage between the waste plastic 3 and the stop-injection opening pin 21.

The upper mold 1 comprises a dispensing plate 11. A dispensing through hole is disposed on the dispensing plate 11. The dispensing through hole tapers upward. The dispensing units dispense plastic into the magnetic steel chamber from the dispensing through hole through the dispensing opening.

The lower mold 2 further comprises a waste plastic plate 23, a stop-injection opening pressing plate 24, a waste plastic driving plate 25 and a release post 26. The waste plastic plate 23 is stacked on the stop-injection opening pressing plate 24. The waste plastic driving plate 25 is disposed at one end of the waste plastic plate 23 and corresponds in position to the waste plastic plate 23. The top acting end of the release post 26 acts on the waste plastic driving plate 25 to prevent the waste plastic plate 23 from moving downward together with the lower mold 2 (i.e., leaving), thereby allowing the waste plastic plate 23 to move away from the stop-injection opening pressing plate 24. The lower mold 2 further comprises a waste material taking mechanism (not shown). As soon as the waste plastic plate 23 moves away from the stop-injection opening pressing plate 24, the suction head of the waste material taking mechanism protrudes and acts on the waste plastic 3, such that the waste plastic 3 is lifted, taken and separated from the waste plastic plate 23, allowing the waste plastic 3 to be taken automatically and precisely in the next manufacturing process.

The dispensing plate 11 of the upper mold 1 further has a dispensing plate driving mechanism. The dispensing plate driving mechanism acts on the dispensing plate 11 to drive the dispensing plate 11 to move away from or move closer to the lower mold 2. In this embodiment, the dispensing plate driving mechanism is provided in the form of a dispensing plate knuckle 10, that is, a mechanical knuckle driving upper mold 1 separates from the lower mold 2.

The dispensing channel is located at the top of the waste plastic plate 23. When the stop-injection opening pressing plate 24 moves downward together with the lower mold 2, The stop-injection opening pin 21 moves downward together with the stop-injection opening pressing plate 24; hence, the waste plastic 3 moves downward together with the stop-injection opening pin 21, enabling separation of the waste plastic 3 and plastic injected into the magnetic steel chamber.

In this embodiment, first, the dispensing units inject plastic into the magnetic steel chamber through the dispensing opening. After a residue of the waste plastic 3 left behind in the dispensing channel has cured, the stop-injection opening pin 21 protruding into the dispensing channel and the waste plastic 3 are engaged with each other by the barb between the pin head portion 27 and the pin body and thus fixed together so as to form a reliable anchorage. When the upper mold 1 separates from the lower mold 2, the stop-injection opening pressing plate 24 of the lower mold 2 causes the stop-injection opening pin 21 to move away from the upper mold 1 (i.e., move downward); hence, the stop-injection opening pin 21 causes the waste plastic 3 to move downward, effectively controlling the separation of the waste plastic 3 and the plastic injected into the magnetic steel chamber.

Second, the upward filling process performed by the dispensing units can prevent air from remaining in the magnetic steel chamber.

The dispensing units each correspond in position to one or two magnetic steel chambers. The dispensing units are arranged in the circumferential direction of the electrically-driven rotor and correspond in position to the magnetic steel chamber. The dispensing units are disposed on the outer sides of the magnetic steel chamber and positioned proximate to the magnetic steel chamber or located in the direction of the projection of the magnetic steel chamber, allowing a large plastic block to be replaced by smaller plastic blocks, and minimizing the length of the dispensing channel. Furthermore, the dispensing opening of each dispensing unit corresponds in position to the magnetic steel chamber from below, allowing upward filling, enhancing the compactness of the plastic filled in the gaps of the magnetic steel chamber, and enhancing the reliability of the magnetic steel chunks fixed in place. Therefore, the present invention effectively avoids a waste of plastic, uneven plastic heating, and premature curing otherwise caused by prolonged plastic flow and reaction. The present disclosure is reliable, robust, short dispensing channel, low waste plasticity, and can effectively ensure separation of the waste plastic 23 and the plastic injected into the magnetic steel chamber, paving the way for subsequent automated operation of delivery of the waste plastic 23.

While the present disclosure has been described by means of specific embodiments, numerous modifications and variations could be made thereto by those skilled in the art without departing from the scope and spirit of the present disclosure set forth in the claims.

What is claimed is:

1. An electrically-driven rotor iron core magnetic steel chamber dispensing device, comprising an upper mold and a lower mold, characterized in that: the lower mold comprises dispensing units each corresponding in position to one or two magnetic steel chambers and arranged in a circumferential direction of the electrically-driven rotor relative to the magnetic steel chambers, with dispensing directions being upward;

the dispensing units each comprise a dispensing channel, a dispensing head, a plunger barrel, a plunger and a stop-injection opening pin, wherein the dispensing channel is disposed above the dispensing head and in communication with the dispensing head, the dispensing head is disposed at the top of the plunger barrel and in communication with the plunger barrel, the plunger is disposed in the plunger barrel to slide upward and downward relative to the plunger barrel, the stop-injection opening pin comprises a pin body, the pin body is disposed vertically, arranged beside the plunger barrel, and fixed to the lower mold from inside, a pin head portion is disposed at a top of the pin body, a barb is disposed between the pin head portion and the pin body, the pin head portion protrudes into the dispensing channel of the dispensing head such that molten plastic in the dispensing channel can enter the barb, wherein, when cured, the plastic forms a reliable anchorage between the waste plastic and the stop-injection opening pin;

the dispensing units in operation inject plastic into the magnetic steel chamber, wherein, after a residue of the waste plastic in the dispensing channel has cured, the pin head portion protruding into the dispensing channel and the waste plastic in the dispensing channel are engaged with each other by the barb and thus fixed together, wherein, upon separation of the upper mold and the lower mold, the lower mold causes the stop-injection opening pin to move away from the upper mold such that the stop-injection opening pin causes the waste plastic to move away from the upper mold, allowing the waste plastic to separate from the plastic injected into the magnetic steel chamber;

wherein the lower mold further comprises a waste plastic plate, a stop-injection opening pressing plate, a waste plastic driving plate and a release post, the waste plastic plate is stacked on the stop-injection opening pressing plate, the waste plastic driving plate is disposed at an end of the waste plastic plate and corresponds in position to the waste plastic plate, a top acting end of the release post acts on the waste plastic driving plate to prevent the waste plastic plate from moving downward together with the lower mold, thereby allowing the waste plastic plate to move away from the stop-injection opening pressing plate.

2. The electrically-driven rotor iron core magnetic steel chamber dispensing device of claim 1, wherein the lower mold further comprises a waste material taking mechanism, and a suction head of the waste material taking mechanism protrudes and acts on the waste plastic as soon as the waste plastic plate moves away from the stop-injection opening pressing plate, such that the waste plastic is lifted, taken and thereby separated from the waste plastic plate.

3. The electrically-driven rotor iron core magnetic steel chamber dispensing device of claim 1, wherein the upper mold comprises a dispensing plate and a gas discharging plate, a dispensing opening is vertically disposed on the dispensing plate, the dispensing opening tapers upward, the dispensing units dispense plastic into the magnetic steel chamber from the dispensing through hole through the dispensing opening, a gas discharging passage is disposed on the gas discharging plate and corresponds in position to another dispensing side of the rotor iron core magnetic steel chamber such that air is discharged through the gas discharging passage during a dispensing process.

4. The electrically-driven rotor iron core magnetic steel chamber dispensing device of claim 3, wherein the dispensing plate further has a dispensing plate driving mechanism, the dispensing plate driving mechanism acts on the dispensing plate to drive the dispensing plate to move away from or move closer to the waste plastic plate.

5. The electrically-driven rotor iron core magnetic steel chamber dispensing device of claim 3, wherein the dispensing channel is disposed at a top of the waste plastic plate, the stop-injection opening pressing plate causes the stop-injection opening pin to move downward as soon as the lower mold causes the stop-injection opening pressing plate to move downward, such that the top-injection opening pin causes the waste plastic to move downward, allowing the waste plastic to separate from the plastic injected into the magnetic steel chamber.

6. The electrically-driven rotor iron core magnetic steel chamber dispensing device of claim 3, wherein the dispensing opening of each said dispensing unit corresponds in position to gaps between the magnetic steel chamber and the magnetic steel chunks from below.

7. The electrically-driven rotor iron core magnetic steel chamber dispensing device of claim 1, wherein each said magnetic steel chamber comprises an even number of magnetic steel chambers.

8. The electrically-driven rotor iron core magnetic steel chamber dispensing device of claim 2, wherein each said magnetic steel chamber comprises an even number of magnetic steel chambers.

9. The electrically-driven rotor iron core magnetic steel chamber dispensing device of claim 3, wherein each said magnetic steel chamber comprises an even number of magnetic steel chambers.

10. The electrically-driven rotor iron core magnetic steel chamber dispensing device of claim 4, wherein each said magnetic steel chamber comprises an even number of magnetic steel chambers.

11. The electrically-driven rotor iron core magnetic steel chamber dispensing device of claim 5, wherein each said magnetic steel chamber comprises an even number of magnetic steel chambers.

12. The electrically-driven rotor iron core magnetic steel chamber dispensing device of claim 6, wherein each said magnetic steel chamber comprises an even number of magnetic steel chambers.

\* \* \* \* \*